(12) United States Patent
Ross

(10) Patent No.: US 8,417,613 B1
(45) Date of Patent: Apr. 9, 2013

(54) METHOD FOR COMPUTING STOCK OPTION VALUE

(76) Inventor: Richard A Ross, Weston, CT (US)

( * ) Notice: Subject to any disclaimer, the term of this patent is extended or adjusted under 35 U.S.C. 154(b) by 394 days.

(21) Appl. No.: 12/619,996

(22) Filed: Nov. 17, 2009

Related U.S. Application Data

(60) Provisional application No. 61/116,331, filed on Nov. 20, 2008.

(51) Int. Cl.
*G06Q 40/00* (2006.01)

(52) U.S. Cl. .................................................. 705/36 R

(58) Field of Classification Search ............... 705/35, 705/37, 36 R
See application file for complete search history.

(56) References Cited

U.S. PATENT DOCUMENTS 7,392,211 B2 * 6/2008 Shlafman et al. ............... 705/35

OTHER PUBLICATIONS

Longstaff, Francis A., Schwartz, Eduardo S.; "Valuing American Options by Simulation: A Simple Least-Squares Approach", The Review of Financial Studies, vol. 14, No. 1, pp. 113-147, Spring 2001.

Areal, Nelson, Rodrigues, Artur, Armada, Manuel R.; "Improvements to the Least Squares Monte Carlo Option Valuation Method", University of Minho, Braga, Portugal, Jan. 2008.

* cited by examiner

*Primary Examiner* — Ojo O Oyebisi
(74) *Attorney, Agent, or Firm* — North Shore Patents, P.C.; Michele Liu Baillie

(57) ABSTRACT

The invention calculates an American option value by: creating a discrete approximation for a self-convolving probability distribution with a pre-determined number of points; creating a discrete approximation of a delta function for one entry of value 1 at a current time; creating probability distributions of returns for a stock underlying the option, for a plurality of times from a current time through an expiry for the option; calculating a probability distribution for a value for the option at expiry; and doing a series of reverse convolutions of the self-convolving distribution with each probability distribution of returns for the stock underlying the option, starting with the probability distribution for the return of the stock at the expiry, and obtaining the current value for the option.

12 Claims, 1 Drawing Sheet

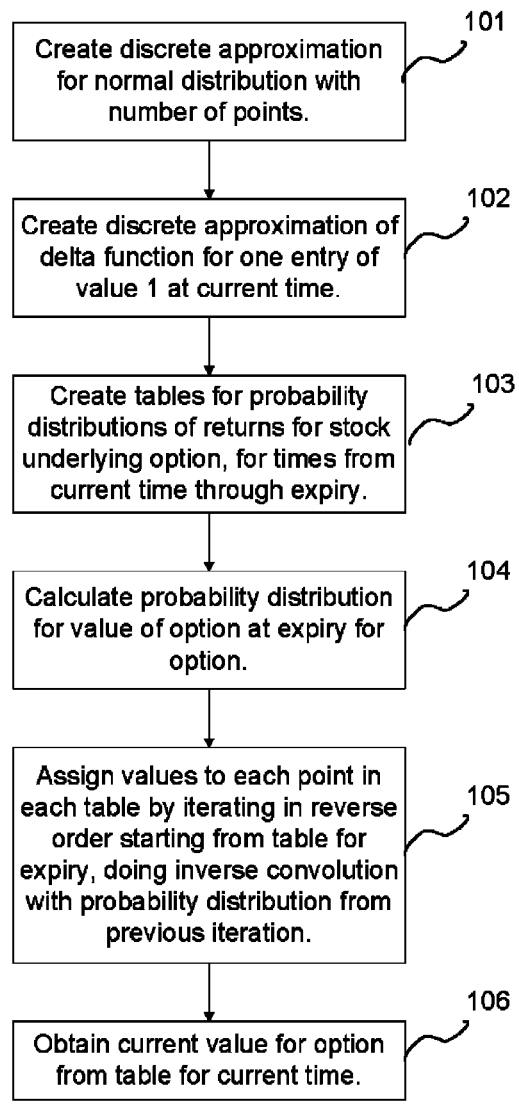

US 8,417,613 B1

METHOD FOR COMPUTING STOCK OPTION VALUE

CROSS REFERENCE TO RELATED APPLICATIONS

This application claims priority to co-pending U.S. provisional patent application entitled "Method for Computing Stock Option Value", Ser. No. 61/116,331, filed on Nov. 20, 2008.

BACKGROUND OF THE INVENTION

Many investors' portfolios include investments in options, as well as mutual funds, stocks, and bonds. Options allow investors to manage and/or hedge risks. There are two popular types of options: American options, and European options. American options can be exercised at any time between the date of purchase and the expiration date. European options are different from American options in that they can only be exercised at the end of their lives.

In order to balance a hedged portfolio, it is necessary to calculate the fair values of associated options. The price of a stock within a portfolio may change many times a second. Therefore, it is necessary to calculate the fair price of American options quickly.

One popular way to calculate the proper price of American options is following the technique of Longstaff and Schwartz, known as the Least Square Monte Carlo (LSMC). The LSMC technique calculates the future price as if the options were European, and then uses least squares curve fitting to work backwards to the next date. Currently, portfolios are balanced overnight. Current techniques, such as the LSMC, do not provide option prices sufficiently fast for real-time portfolio balancing.

What is needed is a new technique for calculating American options which is sufficiently fast to provide real-time portfolio balancing. The invention addresses this need.

BRIEF SUMMARY OF THE INVENTION

The invention provides an improved computer implemented method for calculating American options. The intuition behind the inventive approach come from two observations: (a) the probability distribution for the return of a stock (percentage gain) is assumed to be a Gaussian ("normal") curve; and (b) the convolution of a Gaussian curve with another Gaussian curve results in a Gaussian curve. The inventive method uses these two observations to streamline the options value calculation.

In one aspect, the computer-implemented method for calculating a value of an American stock option, comprises: (a) creating a discrete approximation for a self-convolving probability distribution with a pre-determined number of points, the points representing potential values for the underlying equity; (b) creating a discrete approximation of a delta function for one entry of value 1 at a current time; (c) creating probability distributions of returns for the stock underlying the option; (d) calculating a probability distribution for the return of the stock at expiry, and hence for the probability distribution for the value of the option at expiry; and (e) doing a series of reverse convolutions of the normal distribution with each probability distribution of returns for the stock underlying the option, starting with the probability distribution for the return of the stock at the expiry, to obtain the current value for the option.

The inventive method is able to calculate option values several thousand times faster, and with several times more accuracy, than existing techniques.

BRIEF DESCRIPTION OF THE SEVERAL VIEWS OF THE FIGURES

FIG. 1 is a flowchart illustrating the computer implemented method for calculating American options according to the invention.

DETAILED DESCRIPTION OF THE INVENTION

The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The invention provides an improved computer implemented method for calculating American options. The intuition behind the inventive approach come from two observations: (a) the probability distribution for the return of a stock (percentage gain) is assumed to be a Gaussian ("normal") curve; and (b) the convolution of a Gaussian curve with another Gaussian curve results in a Gaussian curve, i.e., the Gaussian curve is "self-convolving". The inventive method uses these two observations to streamline the options value calculation.

FIG. 1 is a flowchart illustrating a preferred embodiment of the computer implemented method for calculating American options according to the invention. First, a discrete approximation for a normal (Gaussian) distribution is created with a pre-determined number of points (P) (step 101). The points generally represent potential growth for a stock underlying the option during one unit of time per unit of volatility. Also created is a discrete approximation of a delta function, for one entry of value 1 at a current time (step 102). The delta function is the identity function for the convolution operation. A series of tables are then created for the probability distributions of returns for the stock underlying the option, from current time through expiry, or expiration date (step 103). Next, based upon the estimated value of the stock, the probability distribution for the value of the option at expiry is calculated (step 104), and values are assigned to each point in each table by iterating through the tables in reverse order, starting from the table at expiry. The values for each table are obtained by doing a reverse convolution of the normal distribution with the values in the table from the previous iteration (step 105). The current value for the option is then obtained from the table for the current time (step 106).

Note that the tables created in step 103 can be used for any particular stock and do not need to be recreated for each stock. In this embodiment, each table is a discrete approximation to the curve that gives probability of a stock return as a function of that return, at a specific point in time.

Further on step 103, assume that D is set to the possible dates or steps per year in which the options value is of interest. The higher D is, the greater the accuracy of calculation. Assume also that N is set to the number of years, also known as the expiry, or expiration date, of the option. T then is the total number of steps, or N*D. T+1 tables can be created as follows:

table 0=delta (from step 102)

table 1=table 0 convolved with the normal distribution (from step 101)

table 2=table 1 convolved with the normal distribution

. . .

table T=table T−1 convolved with the normal distribution
Each convolution step above results in a normal distribution with a larger practical domain than the normal distribution of the table in the previous convolution step.

Further on step 105, the tables are used in reverse order from table T to table 0, using the dot product of the normal distribution with the values from the table in the previous iteration, to obtain the value of the option at the current time or t=0.

More specifically, values are assigned to each point in each table T through 0 in reverse order by:

For table T, the value at each point is calculated using closed form European, i.e., using a specific equation into which the values of volatility, strike price, dividends (if any), etc. are inserted.

For table T−1, the value at each point is calculated using reverse convolution of the normal distribution with values from table T discounted for time, dividends (if any), and payout if the option is executed.

For table T−2, the value at each point is calculated using reverse convolution of the normal distribution with values from table T−1, discounted for time, dividends (if any), and payout if the option is executed.

. . .

For table 0, the value at each point is calculated using reverse convolution of the normal distribution with values from table 1, discounted for time, dividends (if any), and payout if the option is executed.

One of ordinary skill in the art will understand that there may be other factors which would affect the calculation for the value sat each point in the table without departing from the spirit and scope of the invention.

From this table 0, the option value at t=0 is obtained. If table 0 if of size 1, table 1 is of size P+1, table 2 is of size P+P+1, table 3 is of size 3*P+1, etc., so that all the tables combined are of size order T*T*P. Note that if pruning was done in step 103, small or insignificant numbers are not involved in the calculations of step 105. The size of all the tables combined would then be about P+T*sqrt(T).

The inventive method is able to calculate option values several thousand times faster, and with several times more accuracy, than the LSMC technique.

Although the invention is described above in the context of Gaussian curves, one of ordinary skill in the art would understand that the method can also be used with any self-convolving probability distribution (that is, stable) without departing from the spirit and scope of the invention.

In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In the preferred embodiment, the invention is implemented as a software library or software routine, executable by a computing device. Possible computing devices include one or more servers, a desktop computer, a laptop computer, and a portable computing device such as a Smartphone. The computing device accepts the input parameters for a particular option through user input, an input file, or a live data feed. The inventive routine is then invoked and passed the values of the input parameters. The routine returns a value of the option, which is then presented to a user, stored in a file, sent over a network, or otherwise communicated to an interested party.

In one embodiment, the invention is implemented with a reverse compiler, where the reverse compiler receives computer executable code and outputs the executable code for the method described above.

A system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

I claim:

1. A method for calculating a value of an American stock option implemented by a processor of a computer, comprising:
   (a) creating a discrete approximation for a self-convolving probability distribution with a deterministic number of points, the points representing potential returns for a stock underlying the option;
   (b) creating a discrete approximation of a delta function for one entry of value 1 at a current time t=zero;
   (c) creating by the processor a discrete probability distribution of returns for the stock underlying the option, for a number T of times from the current time t=zero through an expiry for the option;
   (d) calculating a discrete probability distribution for the return of a stock, and hence for the discrete probability distribution for the value for the option at expiry; and
   (e) iteratively determining by the processor a value of the option at a time t=i, for i from T−1 to zero in reverse time order, wherein each iteration comprises: performing a discrete convolution of the discrete probability distribution for the time t=i with the discrete probability distribution for the time t=i+1, wherein the value of the option at time t=zero comprises the current value of the option.

2. The method of claim 1, wherein the creating (c) comprises:
   (c1) creating a plurality of tables for the discrete probability distributions of returns for the stock underlying the option, for the number T of times from the current time t=zero through the expiry for the option, wherein the creating comprises:
- (c1i) creating table zero for time t=zero, wherein the table zero comprises the delta function;
- (c1ii) iteratively creating a table j for a time t=j, for j from 1 to T in time order, wherein each table j is created by convolving the table for time t=j−1 with the self-convolving probability distribution.

3. The method of claim 2, wherein the calculating (e) comprises:
- (e1) assigning values to each point in each of the plurality of tables, wherein the assigning comprises:
  - (e1i) calculating the values to each point in the table T;
  - (e1ii) iteratively calculating the values to each point in the table j, for j from T−1 to zero in reverse time order, wherein for each iteration, the values in table j+1 are convolved with the self-convolving probability distribution; and
- (e2) obtaining the current value for the option from the table for the current time t=zero.

4. The method of claim 3, wherein the iteratively calculating (e1ii) comprises: for each iteration, using a dot product of the self-convolving probability distribution with the values in table j+1.

5. The method of claim 1, wherein the self-convolving probability distribution comprises a normal distribution.

6. A method for determining a calculation method for a value of an American stock option implemented by a processor of a computer, comprising:
- (a) receiving computer executable code by a reverse compiler;
- (b) outputting from the reverse compiler the computer executable code for the calculation method, the code when executed by the processor of the computer:
  - (b1) creates a discrete approximation for a self-convolving distribution with a deterministic number of points, the points representing potential returns for a stock underlying the option;
  - (b2) creates a discrete approximation of a delta function for one entry of value 1 at a current time t=zero;
  - (b3) creates discrete probability distributions of returns for the stock underlying the option, for a number T of times from the current time t=zero through an expiry for the option;
  - (b4) calculates a discrete probability distribution for the return of a stock, and hence for the probability distribution for the value for the option at expiry; and
  - (b5) iteratively determines a value of the option at a time t=i, for i from T−1 to zero in reverse time order, wherein each iteration comprises: perform a discrete convolution of the discrete probability distribution for the time t=i with the discrete probability distribution for the time t=i+1, wherein the value of the option at time t=zero comprises the current value of the option.

7. A computer program product comprising a computer useable medium having a computer readable program for calculating a value of an American stock option, wherein the computer readable program when executed on a computer causes the computer to:
- (a) create a discrete approximation for a self-convolving probability distribution with a deterministic number of points, the points representing potential returns for a stock underlying the option;
- (b) create a discrete approximation of a delta function for one entry of value 1 at a current time t=zero;
- (c) create a discrete probability distribution of returns for the stock underlying the option, for a number T of times from the current time t=zero through an expiry for the option;
- (d) calculate a discrete probability distribution for the return of a stock, and hence for the probability distribution for the value for the option at expiry; and
- (e) iteratively determine a value of the option at a time t=i, for i from T−1 to zero in reverse time order, wherein each iteration comprises: performing a discrete convolution of the discrete probability distribution for the time t=i with the discrete probability distribution for the time t=i+1, wherein the value of the option at time t=zero comprises the current value of the option.

8. The product of claim 7, wherein the create (c) comprises:
- (c1) create a plurality of tables for the discrete probability distributions of returns for the stock underlying the option, for the number T of times from the current time t=zero through the expiry for the option, wherein the creating comprises:
  - (c1i) creating table zero for time t=zero, wherein the table zero comprises the delta function;
  - (c1ii) iteratively creating a table j for a time t=j, for j from 1 to T in time order, wherein each table j is created by convolving the table for time t=j−1 with the self-convolving probability distribution.

9. The product of claim 8, wherein the calculate (e) comprises:
- (e1) assign values to each point in each of the plurality of tables, wherein the assigning comprises:
  - (e1i) calculate the values to each point in the table T;
  - (e1ii) iteratively calculate the values to each point in the table j, for j from T−1 to zero in reverse time order, wherein for each iteration, the values in table j+1 are convolved with the self-convolving probability distribution; and
- (e2) obtain the current value for the option from the table for the current time t=zero.

10. The product of claim 9, wherein the iteratively calculate (e1ii) comprises: for each iteration, using a dot product of the self-convolving probability distribution with the values in table j+1.

11. The product of claim 7, wherein the self-convolving probability distribution comprises a normal distribution.

12. A computer program product comprising a computer useable medium having a computer readable program for determining a calculation method for a value of an American stock option, wherein the computer readable program when executed on a computer causes the computer to:
- (a) receive computer executable code by a reverse compiler;
- (b) output from the reverse compiler the computer executable code for the calculation method, the code when executed by a computer:
  - (b1) creates a discrete approximation for a self-convolving distribution with a deterministic number of points, the points representing potential returns for a stock underlying the option;
  - (b2) creates a discrete approximation of a delta function for one entry of value 1 at a current time t=zero;
  - (b3) creates discrete probability distributions of returns for the stock underlying the option, for a number T of times from the current time t=zero through an expiry for the option;
  - (b4) calculates a discrete probability distribution for the return of a stock, and hence for the probability distribution for the value for the option at expiry; and (b5) iteratively determines a value of the option at a time t=i, for i from T−1 to zero in reverse time order, wherein each iteration comprises: perform a discrete convolution of the discrete probability distribution for the time t=i with the discrete probability distribution for the time t=i+1, wherein the value of the option at time t=zero comprises the current value of the option.

* * * * *